Figure 1:
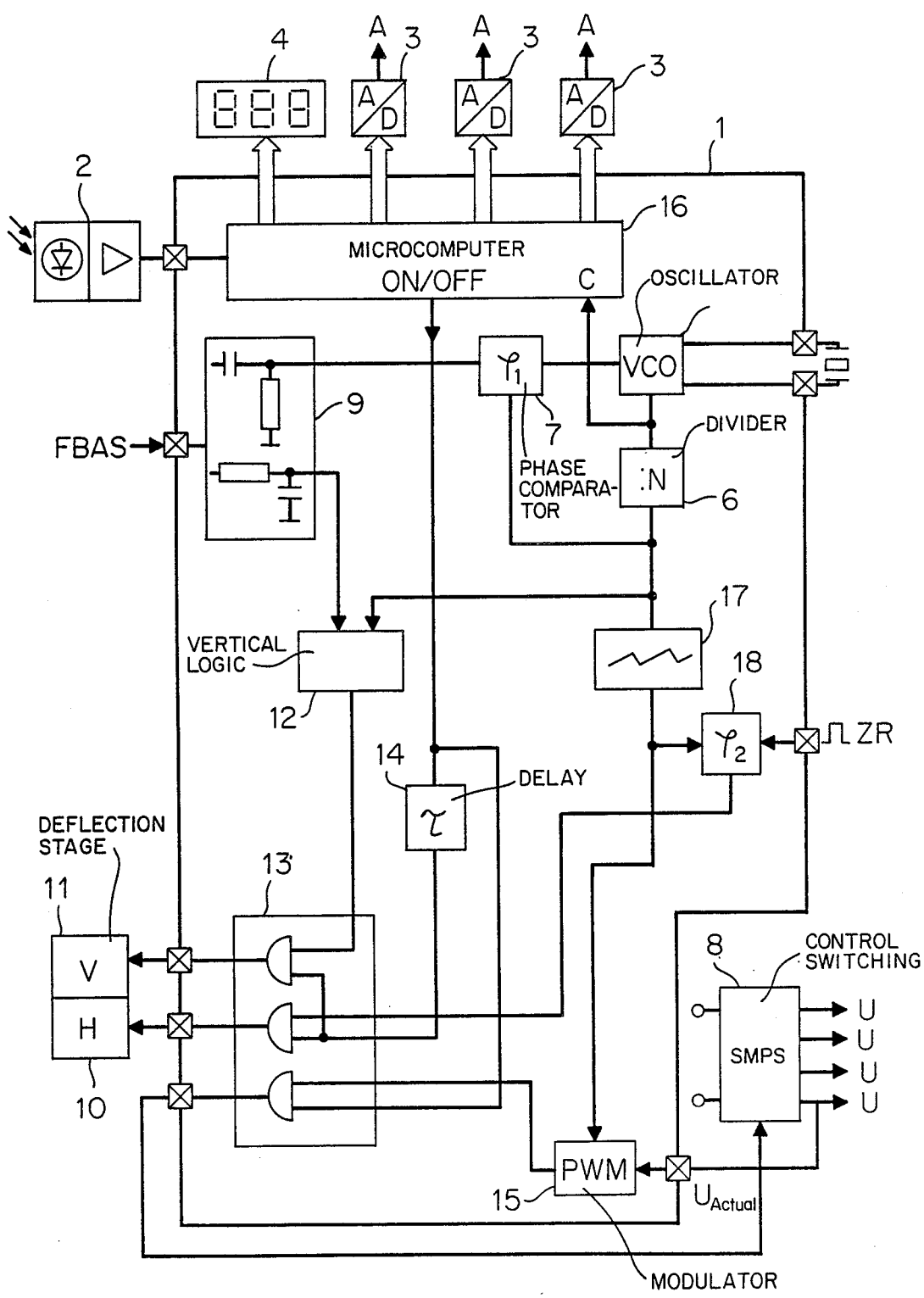

United States Patent [19]

Dieterle et al.

[11] Patent Number: 4,896,214

[45] Date of Patent: Jan. 23, 1990

[54] TELEVISION RECEIVER WITH A MICRO-COMPUTER CONTROLLED OPERATING PART AND A SWITCHING NETWORK PART

[75] Inventors: Franz Dieterle; Erich Geiger, both of Unterkirnach; Uwe Hartmann, Villingen-Schwenningen; Udo Mai, VS-Villingen, all of Fed. Rep. of Germany

[73] Assignee: Deutsche Thomson-Brandt GmbH, Villingen-Schwenningen, Fed. Rep. of Germany

[21] Appl. No.: 250,719

[22] PCT Filed: Nov. 28, 1987

[86] PCT No.: PCT/EP87/00741

§ 371 Date: Oct. 17, 1988

§ 102(e) Date: Oct. 17, 1988

[87] PCT Pub. No.: WO88/04504

PCT Pub. Date: Jun. 16, 1988

[30] Foreign Application Priority Data

Dec. 3, 1986 [DE] Fed. Rep. of Germany ....... 3641303

[51] Int. Cl.$^4$ .......................... H04N 5/04; H04N 9/74
[52] U.S. Cl. ...................................... 358/148; 358/22; 358/158; 358/903
[58] Field of Search .................. 358/22, 148, 903, 158, 358/160

[56] References Cited

U.S. PATENT DOCUMENTS

| | | | |
|---|---|---|---|
| 4,245,251 | 11/1981 | Steckler et al. | 358/158 |
| 4,292,654 | 9/1981 | Steckler et al. | 358/158 |
| 4,464,679 | 8/1984 | Wargo | 358/149 |
| 4,498,098 | 2/1985 | Stell | 358/22 |
| 4,580,165 | 4/1986 | Patton et al. | 358/148 |
| 4,595,953 | 6/1986 | Willis | 358/149 |
| 4,633,313 | 12/1986 | Mogi et al. | 358/903 |
| 4,680,622 | 7/1987 | Barnes et al. | 358/22 |

OTHER PUBLICATIONS

Michel Van Don Driessche et al.; "TV Power Processor T.C. Master Slave Concept"; IEEE Transactions on Consumer Electronics; vol. CE-31, No. 3; Aug. 1985; pp. 132-136.

Primary Examiner—John K. Peng
Attorney, Agent, or Firm—Max Fogiel

[57] ABSTRACT

A television receiver in which a microcomputer controls an operating part, and a clock generator for the microcomputer is synchronized by synchronization pulses in the television signal transmitted to the receiver. The clock generator is also in the form of a control generator for a switching network part and for the deflection stages of the television receiver. The signal from the clock generator is divided and processed by a pulse-width modulator. This pulse-width modulator emits a control signal for controlling the switching network part.

9 Claims, 2 Drawing Sheets

TELEVISION RECEIVER WITH A MICRO-COMPUTER CONTROLLED OPERATING PART AND A SWITCHING NETWORK PART

The invention concerns a television receiver with a micro-computer controlled operating part and a switching network part and deflection stages. Both the micro-computer and the switching network part and the deflection stages necessitate a synchronization signal to ensure that the switching network part, which is often a blocking oscillator, can be synchronized at least with the line frequency or with a multiple thereof and that the deflection stages will be supplied with control signals derived therefrom. The syncrhonization frequency for the micro-computer must be generated with a quartz-stable oscillator that emits a frequency of 4 MHz for example. The switching network part itself uses an oscillator with a ceramic vibrator that emits a frequency of 500 KHz for example. RC or LC oscillators can also be used.

The frequency is divided to obtain the line frequency, which also controls the horizontal and vertical deflection stages.

The object of the invention is to decrease the expense of controlling the switching network part and deflection stages and of synchronizing the micro-computer. This object is attained by the invention recited in the major claim. Other advantageous embodiments of the invention will be evident from the subsidiary claims.

One embodiment of the invention will now be specified with reference to the drawing, which is a block diagram of the circuit components essential to the invention.

One function of a micro-computer 16 is to shape the remote-control signals received by a detector 2 in a television receiver into control signals that are either turned into analog control signals A in a digital-to-analog converter 3 or utilized by way of a bus line to control operation. Settings can be displayed on a digital or analog indicator 4. Micro-computer 16, a Hitachi HD 404 918 P, for example, requires a clock signal that matches its operating frequency, which is in this embodiment generated by a voltage-controlled oscillator (VCO) and supplied to micro-computer 16. The clock frequency is generated in the present embodiment in accordance with the known PLL technique by comparing it with a reference frequency in a frequency divider 6 that is part of a phase comparator 7. The television receiver also contains at least one frequency-and-phase synchronized oscillator to generate the signals that control switching network part 8, line deflection, and if necessary a vertical logic circuit 12. Vertical logic circuit 12 can be a countdown circuit for example. A circuit of this type is specified for example in German Patent 3 127 493. The present invention does not need the special oscillator usually required for this circuit because a clock-oscillator 5 in micro-computer 16 is also exploited to control switching network part 8 and deflection stages 10 and 11. Clock-oscillator 5 is for this purpose synchronized with the line frequency of the composite color-television signal. Since the composite-color signal arrives by way of an amplitude filter 9 at the phase comparator 7 in the PLL circuit, the frequency deriving from clock-oscillator 5 and divided by frequency divider 6 meshes into the composite-color line frequency.

A line-frequency sawtooth signal is shaped out of the line-frequency signal in a circuit 17 and supplied to the input terminal of a pulse-width modulator 15. The actual information $U_{1st}$ obtained from switching network part 8 is applied to another input terminal of pulse-width modulator 15, and a pulse-width modulated signal that activates switching network part 8 is accordingly derived as a function of that information.

Figure 2:
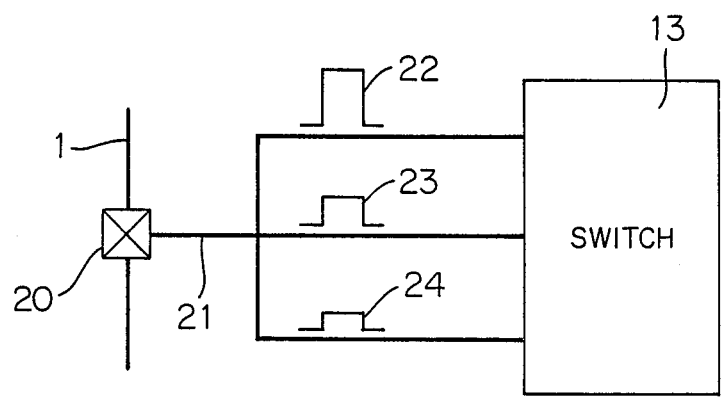

The signal from circuit 17 is also compared with line flyback ZR in a phase comparator 18 to obtain a signal for controlling deflection stage 10. The signals from stages 11, 15, and 18 are supplied to a switch 13 with three input terminals and three output terminals that can be switched on and off by means of a digital control signal. This switch can be the Motorola MC 14081 described on pages 5 to 150 of the handbook Semiconductor Library C-MOS, Vol. 5 (1976). It is also conceivable to have only one output terminal 20 (FIG. 2) for the control signals, with a combined control signal in the form of a tri-state signal 21. A signal of this type consists of three different levels, 22, 23 and 24 each of which is associated with a control signal. The different levels can be converted back into three different signals in a level-detector circuit.

The system just described makes it possible to turn the television receiver on and off in a simple way in that the pulses that control switching network part 8, horizontal deflection stage 10, and vertical deflection stage 11 can be turned on an off by way of switch 13, which is controlled by micro-computer 16. Initial switch-on energy can be saved by delaying the pulses that control the deflection stages by way of a delay circuit 14 such that they will not appear until switching network part 8 has been turned on. This approach allows energy-saving standby operation.

Figure 3:
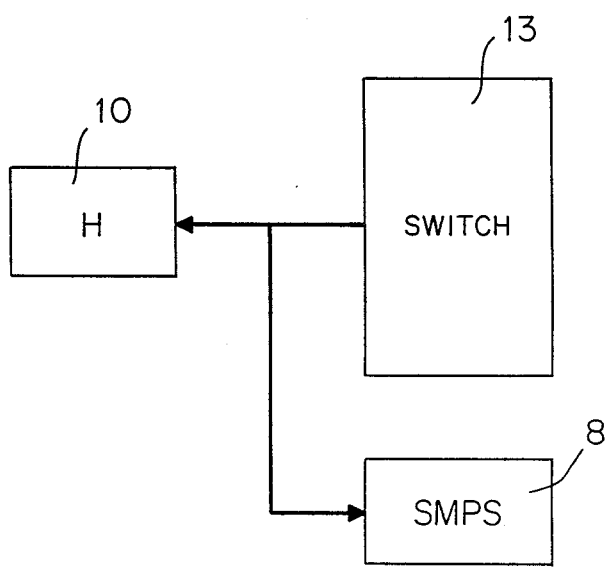

The signals that control the horizontal deflection stage 10 and the switching network part 8 may also be combined into one signal (FIG. 3).

Micro-computer 16 can be combined with the remain components 5, 6, 7, 9, 12, 13, 14, 14, 15, 17, and 18 into a single novel integrated circuit 1.

We claim:

1. A television receiver comprising: a micro-computer controlled operating part; a switching network part; deflection stages; said television receiver receiving a television signal with synchronization pulses; a micro-computer for controlling said operating part; a clock generator for said micro-computer and synchronized by said synchronization pulses; said clock generator also comprising a control generator for said switching network part and for said deflection stages; a pulse-width modulator for dividing and processing a signal from said clock generator and emitting a control signal for controlling said switching network part.

2. A television receiver as defined in claim 1, including phase-comparator means for dividing and processing a signal from said clock generator; said deflection stages having a horizontal deflection stage, said phase-comparator means having an output for controlling said horizontal deflection stage.

3. A television receiver as defined in claim 1, including a frequency divider for dividing a signal from said clock generator; a vertical logic circuit, said frequency divider having an output for controlling said vertical logic circuit.

4. A television receiver as defined in claim 1, including delay means, said switching network part being turned on directly and said deflection stages being turned on through said delay means when said television receiver is turned on.

5. A television receiver as defined in claim 1, including an integrated component for combining signals controlling deflection of electron beams in a picture tube of the television receiver and said switching network part.

6. A television receiver as defined in claim 5, wherein said deflection stages have a horizontal deflection stage; and means for combining signals controlling said horizontal deflection stage and said switching network part into one signal.

7. A television receiver as defined in claim 5, wherein said signals controlling deflection of said electron beams and said switching network part are emitted in form of a tri-state signal through a single output of said integrated component.

8. A television receiver as defined in claim 5, including switch means for turning off said signals controlling deflection of electron beams in said picture tube and said switching network part.

9. A television receiver as defined in claim 8, wherein said switch means is blocked and released by said microcomputer.

* * * * *